(12) United States Patent
Kim (10) Patent No.: US 12,002,029 B2
(45) Date of Patent: Jun. 4, 2024

(54) SYSTEM AND METHOD FOR TRANSMITTING RECEIPT INFORMATION USING MOBILE TERMINAL

(71) Applicant: Allink Co., Ltd., Seoul (KR)

(72) Inventor: Kyung Dong Kim, Seongnam-si (KR)

(73) Assignee: Allink Co., Ltd., Seoul (KR)

( * ) Notice: Subject to any disclaimer, the term of this patent is extended or adjusted under 35 U.S.C. 154(b) by 0 days.

(21) Appl. No.: 17/483,696

(22) Filed: Sep. 23, 2021

(65) Prior Publication Data

US 2022/0215372 A1    Jul. 7, 2022

(30) Foreign Application Priority Data

Jan. 4, 2021    (KR) .................. 10-2021-0000566

(51) Int. Cl.
 *G06Q 20/20*    (2012.01)
 *G06Q 20/32*    (2012.01)
 *H04L 9/40*    (2022.01)
(52) U.S. Cl.
 CPC ......... *G06Q 20/209* (2013.01); *G06Q 20/202* (2013.01); *G06Q 20/204* (2013.01); *G06Q 20/3278* (2013.01); *H04L 63/0876* (2013.01)
(58) Field of Classification Search
 None
 See application file for complete search history.

(56) References Cited

U.S. PATENT DOCUMENTS

| 2003/0055733 A1 | 3/2003 | Marshall et al. |
| 2016/0196538 A1 | 7/2016 | Mori et al. |
| 2016/0203680 A1 * | 7/2016 | Sambe ................ G06F 16/9554 235/383 |
| 2016/0292677 A1 * | 10/2016 | Karlsson ............ G06Q 20/3276 |
| 2018/0005220 A1 | 1/2018 | Laracey et al. |
| 2021/0073764 A1 * | 3/2021 | Sakurai ................ G06Q 20/204 |

(Continued)

FOREIGN PATENT DOCUMENTS

| CN | 109509045 A |   | 3/2019 |
| JP | 2005503610 A | * | 8/2002 |
| JP | 2003-203274 A |   | 7/2003 |

(Continued)

*Primary Examiner* — Ariel J Yu
(74) *Attorney, Agent, or Firm* — Park, Kim & Suh, LLC (57) ABSTRACT

The present invention provides a system for transmitting receipt information using a mobile terminal. The receipt information transmitting system comprises: a merchant terminal ID provider configured to store a merchant terminal ID; a mobile terminal of a user configured to acquire the merchant terminal ID from the merchant terminal ID provider and to generate a first message for requesting receipt information including the acquired merchant terminal ID; a receipt information transmission server configured to receive the first message from the mobile terminal and to generate a second message for requesting the receipt information; and a merchant terminal configured to receive the second message from the receipt information transmission server and to transmit the receipt information to the receipt information transmission server, in response to the second message, wherein the receipt information transmission server transmits the receipt information received from the merchant terminal to the mobile terminal.

13 Claims, 4 Drawing Sheets

(56) References Cited

U.S. PATENT DOCUMENTS

2021/0224775 A1* 7/2021 Sambe ................... G06Q 20/20
2022/0414620 A1* 12/2022 Shimazu ................ G06Q 30/06

FOREIGN PATENT DOCUMENTS

| | | |
|---|---|---|
| JP | 2006-202190 A | 8/2006 |
| JP | 2014-194731 A | 10/2014 |
| JP | 2015-084162 A | 4/2015 |
| JP | 2016-126761 A | 7/2016 |
| JP | 6322383 B2 | 5/2018 |
| KR | 10-2006-0008309 A | 1/2006 |
| KR | 10-2006-0060985 A | 6/2006 |
| KR | 10-2196515 B1 | 12/2020 |
| RU | 2660618 C2 | 7/2018 |
| TW | I616832 B | 3/2018 |
| TW | 202009828 A | 3/2020 |

* cited by examiner

SYSTEM AND METHOD FOR TRANSMITTING RECEIPT INFORMATION USING MOBILE TERMINAL

CROSS-REFERENCE TO RELATED APPLICATIONS

This application claims the earlier filing date and right of priority to Korean Patent Application No. 10-2021-0000566 filed on Jan. 4, 2021, the contents of which are incorporated herein by reference in its entirety.

BACKGROUND OF THE INVENTION

Field of the Invention

The present invention relates to a system for transmitting receipt information using a mobile terminal and a method thereof, and more particularly, to the transmitting system and method allowing a user to receive an electronic receipt via a smartphone.

Description of the Related Art

Consumers are increasingly using credit cards to purchase goods (or products) and services. When a consumer pays using a credit card at an offline store for an on-site purchase, receipt information is automatically transmitted to a receipt printer connected to a POS (point-of-sale) system or a card terminal installed in the store, and a receipt is printed for the consumer. In addition, even when the consumer pays in cash, a seller or a merchant issues a cash receipt, and the merchant uses the receipt printer to issue a waiting number as well as the receipt.

In general, the receipt printed on paper is issued to the consumer, and the consumer keeps the issued receipt for use as proof of expenditure or for future payment cancellation, return, or exchange purposes. However, when the credit card or the like is used, since payment information can be inquired through a website of a credit card company, the consumer often does not receive the paper receipt.

As such, when the consumer does not receive the paper receipt, the paper receipt printed from the receipt printer is usually discarded. The merchant needs to dispose of the discarded paper receipts as garbage and to incur unnecessary expense to print the paper receipts.

Furthermore, information recorded on the paper receipts such as sales operators, sales goods (services), sales places, sales dates, and buyers cannot be properly used. In other words, if the information on the receipt is collected and converted into a database, such information can be used for efficient marketing and promoting by analyzing information on a place, a time, and a product (or service) on which the consumption occurs. Nevertheless, such valuable information is discarded with being printed on paper.

SUMMARY OF THE DISCLOSURE

The present invention is contemplated to solve problems in the prior art mentioned above. Thus, an object of the present invention is to provide a system allowing a user to receive an electronic receipt via a mobile terminal and a method thereof.

To solve the above problems, according to one aspect of the invention, the present invention provides a system for transmitting receipt information, the system comprising: a merchant terminal ID provider configured to store a merchant terminal ID; a mobile terminal of a user configured to acquire the merchant terminal ID from the merchant terminal ID provider and to generate a first message for requesting receipt information including the acquired merchant terminal ID; a receipt information transmission server configured to receive the first message from the mobile terminal and to generate a second message for requesting the receipt information; and a merchant terminal configured to receive the second message from the receipt information transmission server and to transmit the receipt information to the receipt information transmission server, in response to the second message, wherein the receipt information transmission server transmits the receipt information received from the merchant terminal to the mobile terminal.

Further, according to the other aspect, the present invention provides a method for transmitting receipt information, the method comprising: receiving, by a receipt information transmission server, a first message for requesting receipt information including a merchant ID, from a mobile terminal of a user; transmitting, by the receipt information transmission server, a second message for requesting the receipt information to a merchant terminal, referring to the merchant ID, in response to the received first message; receiving, by the receipt information transmission server, the receipt information from the merchant terminal; and transmitting, by the receipt information transmission server, the receipt information received from the merchant terminal to the mobile terminal.

Details of examples or implementations will be described in the following with reference to the accompanying drawings. Other features will be apparent from the description and drawings, and from the claims.

BRIEF DESCRIPTION OF THE DRAWINGS

The present invention will become more fully understood from the detailed description given herein below and the accompanying drawings, which are given by illustration only, and thus are not intended to limit the scope of the present Invention, wherein.

DETAILED DESCRIPTION OF THE PREFERRED EMBODIMENT

Description will now be given in detail according to examples disclosed herein, with reference to the accompanying drawings. For the sake of brief description with reference to the drawings, the same or equivalent components may be provided with the same reference numbers, and description thereof will not be repeated. In the following, any conventional art which is well-known to one of ordinary skill in the relevant art has generally been omitted for the sake of brevity. The accompanying drawings are used to help easily understand various technical features and it should be understood that the examples presented herein are not limited by the accompanying drawings. As such, the present invention should be construed to extend to any alterations, equivalents and substitutes in addition to those which are particularly set out in the accompanying drawings.

A singular representation may include a plural representation unless it represents a definitely different meaning from the context.

Terms such as "comprise", "include" or "have" are used herein and should be understood that they are intended to indicate an existence of several components, functions or steps, disclosed in the specification, and it is also understood that greater or fewer components, functions, or steps may likewise be utilized. Moreover, due to the same reasons, it is also understood that the present invention includes a combination of features, numerals, steps, operations, components, parts and the like partially omitted from the related or involved features, numerals, steps, operations, components and parts described using the aforementioned terms unless deviating from the intentions of the original disclosure.

Figure 1:
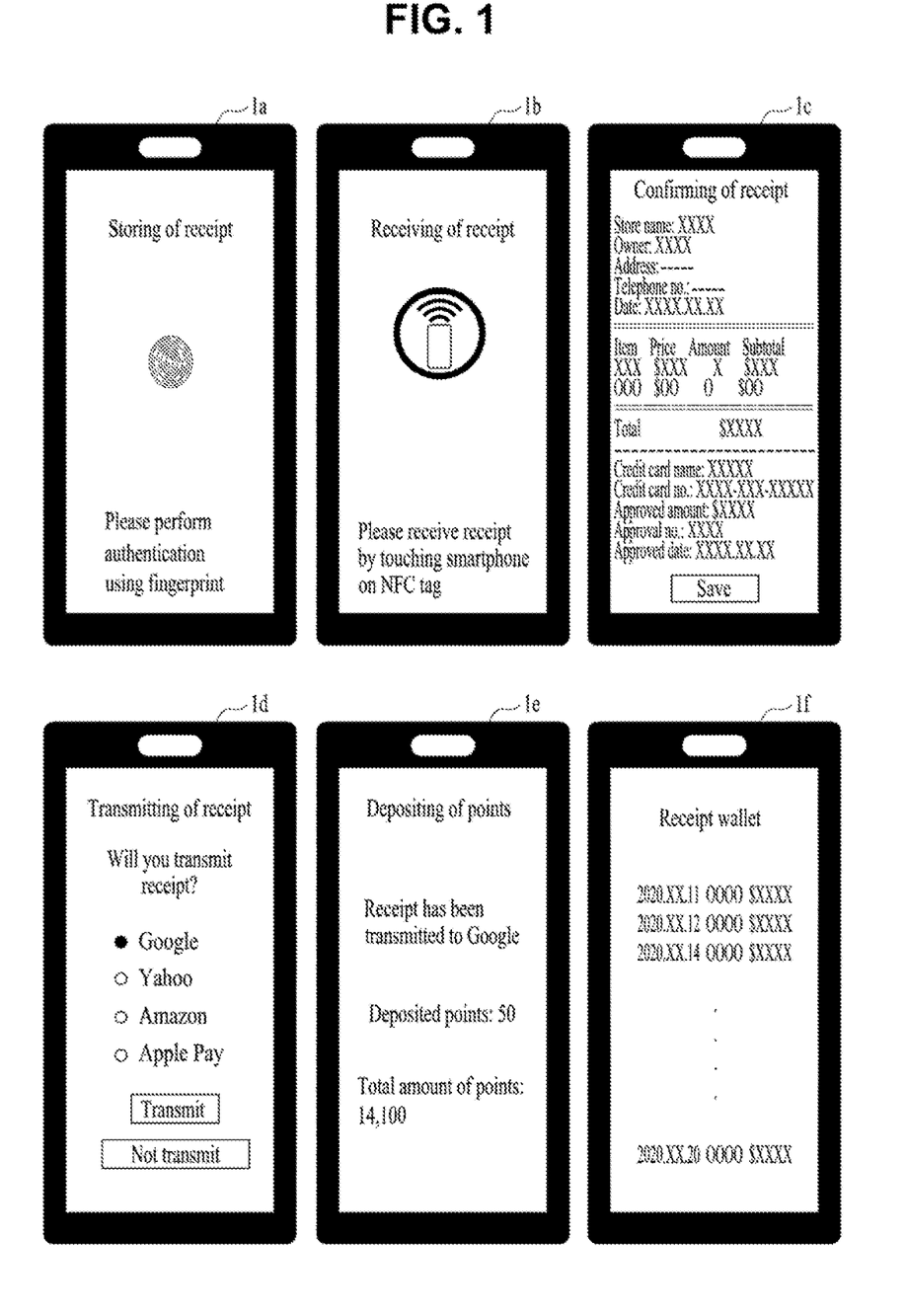
FIG. 1 illustrates an embodiment showing steps of transmitting and receiving receipt information using a mobile terminal, according to the present invention.

FIG. 1 illustrates an embodiment showing steps of transmitting and receiving receipt information using a mobile terminal, according to the present invention. Particularly, FIG. 1 shows smartphone screens during processes of transmitting and receiving the receipt information using a smartphone, i.e., the mobile terminal, according to an embodiment of the present invention.

When a user, i.e., a buyer decides on products (or goods) or services to purchase at an offline store, a merchant (or a seller) inputs information about a transaction item into a merchant terminal such as a point of sale (POS) system, and requests payment from the user.

When the user passes a credit card to the merchant to pay for the purchased item, the merchant inserts the credit card received from the user into a card slot of the merchant terminal. The merchant terminal such as the POS system performs payment for the product by communicating with an approval or authentication server for the credit card using credit card information read via the card slot or reader of the merchant terminal. Further, the user may pay in case or use a mobile payment to purchase the product or service at the offline store, and in these cases, the merchant terminal may be also used to process the transaction for purchasing the product or service. The mobile payment (or the digital wallet) allows the user to make payments using the smartphone. The mobile payment digitizes and stores information of the credit or debit card chip and PIN transaction, and thus can replace these conventional payment means requiring the physical contact or manipulation thereof. The mobile payment can transmit such digitized information in a contactless method to the merchant terminal in response to a request for payment. Such mobile payment can be referred to a "simple payment" for its easy and convenient way of use.

When the payment through the credit card is completed, the merchant terminal transmits receipt information to a receipt printer which is also located in the store. The receipt information may include information of a business operator such as a trade name (or a store name) and a representative (or an owner), store information such as an address and a phone number of the store, product information such as a name, a quantity and a price of the product purchased by the user, and payment information such as a credit card company, a credit card number, an approval amount, and an approval date. Then, the receipt printer prints the received receipt information according to the prescribed receipt format.

Meanwhile, the merchant may select or input a command for the merchant terminal to transmit the receipt information to the user's smartphone, instead of printing the receipt information at the merchant terminal.

In addition, the merchant may select or input a command for the merchant terminal to print the receipt information and to transmit the receipt information to the user's smartphone at the same time.

For example, when the user decides on the product (or service) to be purchased and requests payment by presenting a credit card to the merchant, the merchant may ask whether the user wants the paper receipt, an electronic receipt for the user's smartphone, or both of the paper and electronic receipts.

If the user requests the electronic receipt, for example, the merchant may press a virtual button for the electronic receipt displayed on the merchant terminal, and the merchant terminal may wait or stand by for a predetermined period of time to transmit the receipt information to a receipt information transmission server, instead of forwarding the receipt information to the printer, until such a receipt information transmission server requests the receipt information to the merchant terminal. Such standby or waiting allows the user the sufficient time period for requesting the receipt information to the receipt information transmission server while specifying the merchant terminal from which the receipt information should to be taken.

Then, the user performs user authentication by executing an application dedicated to receiving or storing the receipt (hereinafter referred to as "receipt storing application"), which is installed in the user's smartphone in order to receive the electronic receipt at the smartphone (step 1a). The user may subscribe for a service for receiving and storing an electronic receipt from the merchant (i.e., merchant terminal) at the offline store, which is provided by a receipt storing service provider, in advance. More specifically, after the subscription, the smartphone of the user may install the receipt storing application downloaded from a server (hereinafter referred to as "receipt information transmission server") configured to transmit receipt information (i.e., the electronic receipt) to the user's smartphone upon request, which is operated by the receipt storing service provider. Upon executing the receipt storing application and performing the required authentication, a dedicated communication channel is established between the user's smartphone and the receipt information transmission server in order for the smartphone to be provided with the requested service, i.e., the electronic receipt from the merchant terminal via the receipt information transmission server.

The user's smart phone displays a guide for the user to touch the smart phone on a near field communication (NFC) tag, i.e., a merchant terminal ID provider to obtain a merchant terminal ID (step 1b). In the followings, an example where the merchant terminal ID provider comprising the NFC tag will be described, but the merchant terminal ID provider may be implemented in various devices such as a quick response (QR) code or a barcode, which are capable of transmitting a predetermined information such as the merchant terminal ID to the smartphone with a simple manipulation of the smartphone.

The user acquires the merchant terminal ID by touching the user's smartphone to the NFC tag (i.e., the merchant terminal ID provider), and transmits the acquired merchant terminal ID to the receipt information transmission server with the request for the receipt information. In response to the user's request, the receipt information transmission server locates the merchant terminal using the received terminal ID and requests the located merchant terminal to transmit the receipt information on the standby at the merchant. Then, the receipt information transmission server receives the receipt information from the merchant terminal and transmits the same to the user's smartphone. The user's smartphone receives the receipt information from the receipt information transmission server and displays the received receipt information (step 1c).

When the user stores the receipt information in the user's smartphone, the receipt storing application displays on the user's smartphone screen a window asking whether to transmit the receipt information to a third party (step 1d).

An online service providers such as simple or mobile payment providers or internet portal service provider can perform more efficient marketing or promoting by analyzing the receipt information transmitted from consumers (i.e., the users). Therefore, the online service providers may provide the users who use the receipt storing application with a certain amount of compensation or reward in exchange for the receipt information.

When the user selects at the window the online service provider to whom the receipt information is transmitted and presses a transmission button, the receipt information is transmitted to the selected service provider, particularly to a server of such selected service provider, and a message indicating a point provided by the online service provider as the reward is displayed on the user's smartphone (step 1e).

Meanwhile, before transmitting the receipt information (i.e., in step 1d), the promotion event proposed to the user by the online service provider may be displayed on the smartphone in order for the user to decide to transmit the receipt information to the third party, i.e., the online service provider. Such proposals may motivate the user to transmit the receipt information to the online service provider or to install an application dedicated to such an online service provider.

Further, the user can check a list of receipts received so far by calling for a receipt wallet menu of the receipt storing application (step 1f). When a specific receipt is selected among the receipts displayed in the receipt list by the user, the detailed receipt information may be checked.

The user may select and transmit a single receipt to the third party (including the online service provider) in step 1d. However, the user may select a plurality of receipts in step 1f configured for checking the receipt list and transmit the selected receipts to the third party at once.

Figure 2:
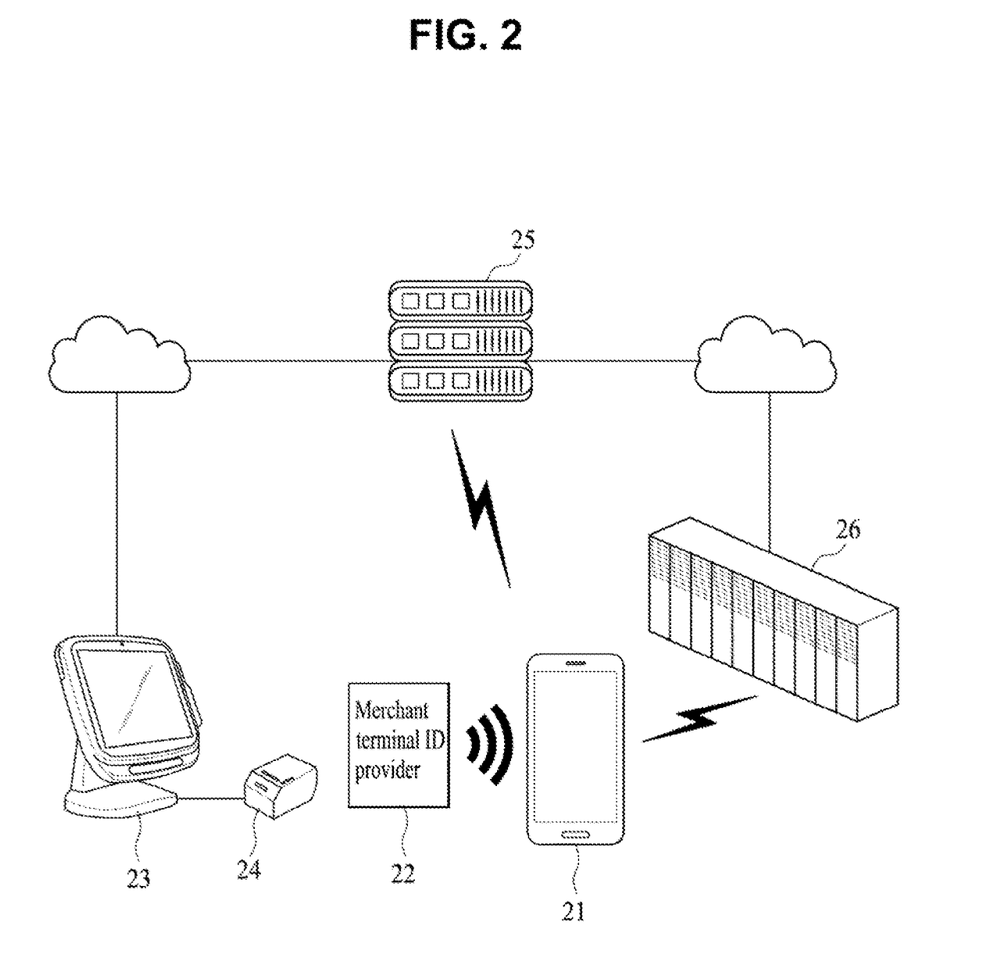
FIG. 2 illustrates a system for transmitting receipt information according to one embodiment of the present invention.

FIG. 2 illustrates a system for transmitting receipt information according to one embodiment of the present invention.

As shown in FIG. 2, the receipt information transmission system according to the present invention includes a user smartphone 21, a merchant terminal ID provider 22, a merchant terminal 23, a receipt printer 24, and a receipt information transmission server 25, and an online service provider server 26. The smartphone 21 is one of a mobile terminal which is portable and is able to communicate with other external devices by using various network protocols. In the followings, the system and method employing the smartphone 21 as the mobile terminal are described, but other types of the mobile terminal like a tablet PC may be applied to the system and method of the present invention with no substantial modification. Further, for concise description of the invention, the merchant terminal ID provider 22, the receipt information transmission server 25, and the online service provider server 26 are referred to as the "ID provider 22," the "transmission server 25," and the "provider server 26," respectively.

The user pays for the product or service by the credit card, the cash, or the simple or mobile payment using the smartphone at the offline store. For the payment for product or service, information such as a name of the product or service, transaction date and time, a transaction amount, a payment method and so on is entered to the merchant terminal 23, and among such information, information required for issuing the receipt (i.e., the receipt information) is transmitted to the receipt printer 24 and is printed on the receipt. Then, the printed paper receipt is issued to the user.

Meanwhile, the merchant terminal 23, particularly a point-of-sale (POS) program installed in the terminal 23 supports a function of selecting a method for issuing the receipt, i.e., selecting the electronic receipt or the paper receipt. When the user of the smartphone 21 requests the electronic receipt using the smartphone 21, the merchant terminal 23 may transmit the electronic receipt to the user's smartphone 21, instead of printing the paper receipt at the receipt printer 24.

When the user completes the payment via the cash, the credit card, or the mobile payment using the merchant terminal 23 at the offline store, the merchant terminal ID is obtained using the smartphone 21 to receive the receipt information. Under the offline circumstances like the offline store, due to the compatibility issues in both of software and hardware, it is very unlikely that the different merchant terminals 23 used at the offline stores are all configured to directly communicate with the smartphone 21. Thus, the smartphone 21 is unable to receive the receipt information directly from the merchant terminal 23. For these reasons, in the present invention, the receipt storing service provider, particularly the receipt information transmission server 25 (briefly, the transmission server 25) is interposed between the merchant terminal 23 and the smartphone 21 to provide the desired receipt information to the user. More specifically, the transmission server 25 is configured to locate or identify the merchant terminal 23 with which the user has made the transaction, and to relay or deliver the receipt information from the identified merchant terminal 23 to the smartphone 21 of the user. For such a purpose, the merchant terminal ID is used to identify the merchant terminal 23 responsible for issuing and providing the receipt information. In this case, the merchant terminal ID provider 22, briefly the ID provider 22 is provided to each of the merchant terminal 23 at the offline stores. The ID provider 22 has the merchant terminal ID unique for the corresponding merchant terminal 23 within the network. The ID provider 22 may be implemented as the QR code, the barcode, or the NFC tag such that the merchant terminal ID can be directly transmitted to the smartphone 21. As it is preferable for the ID provider 22 to be implemented as the NFC tag for the convenience of the user, the present invention will be further described below based on an example that the ID provider 22 comprises the NFC tag.

When the user touches the smartphone 21 on (or approaches the smartphone 21 to) the ID provider 22, i.e., the NFC tag, the smartphone 21 acquires the merchant terminal ID from the ID provider 22.

The smartphone 21 transmits the merchant terminal ID obtained from the ID provider 22 to the transmission server 25 using a communication network, for example, a wireless network, along with a request for the receipt information, and the transmission server 25 request the transmission of the receipt information to the merchant terminal 23 corresponding to the merchant terminal ID received from the smartphone 21.

The merchant terminal 23 transmits the receipt information to the transmission server 25 in response to the transmission request from the transmission server 25, and the transmission server 25 transmits the received receipt information to the smart phone 21 through the network, particularly the wireless network.

As already described above with reference to FIG. 1, the user may subscribe for the receipt storing service provided by the transmission server 25 of the receipt storing service provider. When the user executes the receipt storing application configured for and dedicated to such a service, the executed application and the transmission server 25 initiate and perform steps or processes as descried above for retrieving the receipt information from the identified merchant terminal 23. Therefore, the transmission server 25 delivers the request for the receipt information to the merchant terminal 23 in place of the smartphone 21, and then delivers the requested receipt information to the smartphone 21 in place of the merchant terminal 23. That is, the transmission server 25 connects the smartphone 21 and the merchant terminal 23 for the exchange of the request and the requested information.

As a result, the receipt information is received at the smartphone 21, and the user can store and keep the receipt information in the user's smartphone 21. Meanwhile, the user may transmit the receipt information received at the smartphone 21 to the online service provider server 26, depending on the user's selection or decision. The online service provider server 26 (briefly, the provider server 26) is operated by the provider who provides any Internet based services such as the portal service, payment service and so on. Such service are oriented or adapted to the user's needs, and thus requires the user's information like the receipt information which shows the pattern for user's behavior.

In this case, the online service provider (i.e., the provider server 26) may provide the reward such as the points or cyber money or the promotion event such as the free gift to the user who has transmitted the receipt information in order to use the receipt information as basic information for marketing and promoting the business.

Figure 3:
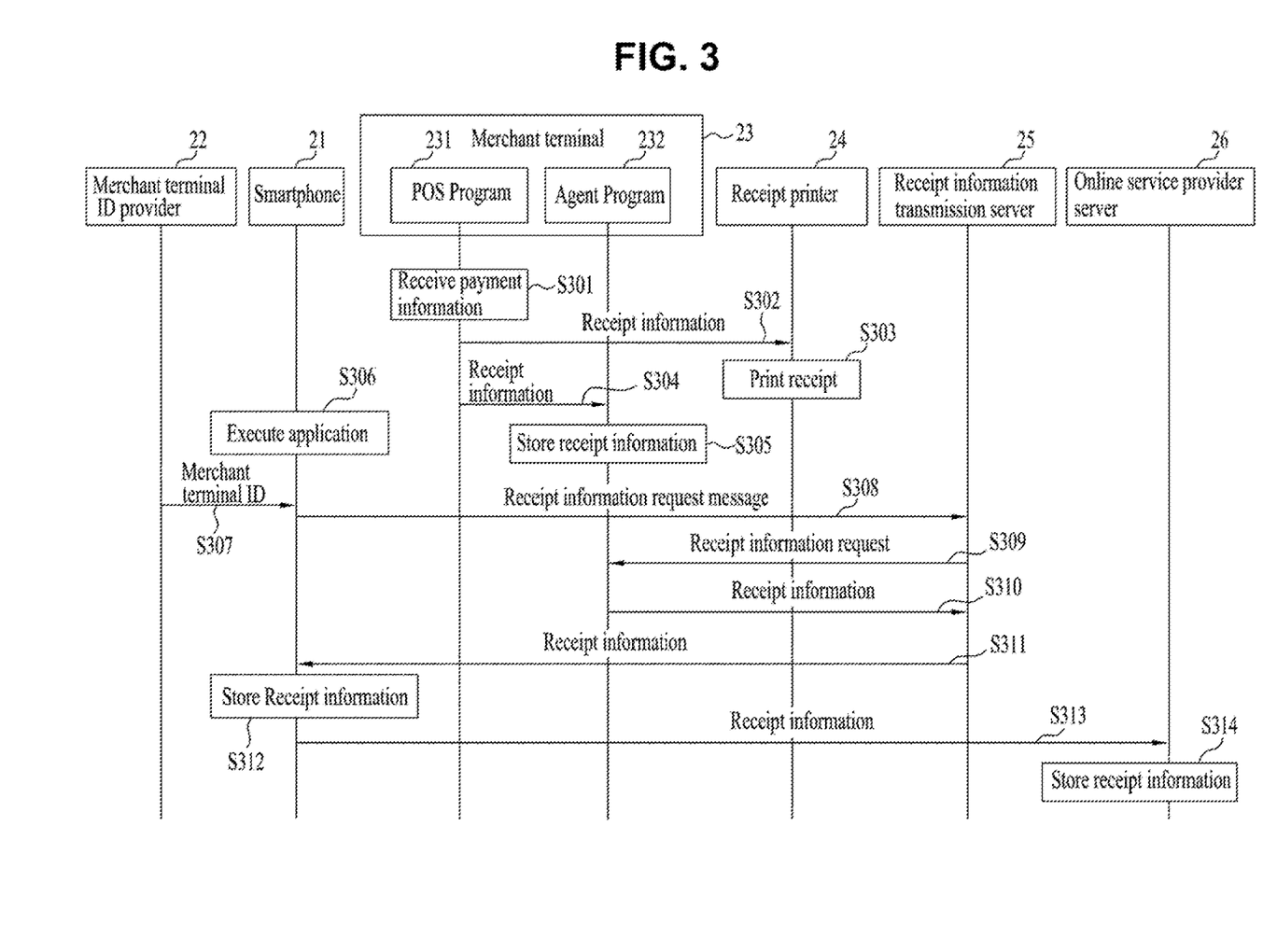
FIG. 3 is a signal processing chart showing a first embodiment of a method for transmitting receipt information according to the invention.

FIG. 3 is a signal processing chart showing a first embodiment of a method for transmitting receipt information according to the invention.

As shown in FIG. 3, when the user pays for the product or service using various methods such as the credit card, the cash, or the simple or mobile payment using a smartphone, information related to the product or service transaction is transmitted and inputted to the merchant terminal 23 (S301).

The merchant terminal 23 may be various devices for inputting and/or managing transaction details, but in the embodiment as below, for example, the merchant terminal 23 comprising the POS system will be described.

When the merchant terminal 23 comprises the POS system, a POS program 231 which is software for operating the POS system is installed in the merchant terminal 23. In addition, an agent program 232 for performing a predetermined function may be installed in the POS system. More specifically, the POS program 231 is configured to process all the transactions with the user including the processing of the payment information. For example, the POS program 231 may comprises an operating system and any subsidiary application or client programs controlled by such an operating system. The agent program 232 may be installed at the merchant terminal 23 when the merchant terminal 23 is associated with the receipt storing service provided by the transmission server 25. The agent program 232 is configured to serve as a software interface between the merchant terminal 23 and the transmission server 25, which enable the data exchange, and thus to establish the communication channel therebetween. The agent program 232 continuously operates in the background of the merchant terminal 23, i.e., the POS program 231 while keeping the communication channel open to the transmission server 25. Further, the agent program 232 interprets and converts any data like the request or the command received from transmission server 25 into a format receivable or executable at the POS program 231, and delivers such converted data to the POS program 231. Alternatively, in a similar manner, the agent program 232 interprets and converts any data, for example, the receipt information obtained from POS program 231 into a format receivable or executable at the transmission server 25 and transmits such converted data to the transmission server 25. With such an agent program 232, the transmission server 25 has the compatibility in communication with any merchant terminal 23 and the POS program 231 therein regardless of their configurations. Accordingly, the transmission server 25 can be directly associated with the merchant terminal 23 to process the receipt information, in response to the request from the smartphone 21.

When the payment information is inputted to the merchant terminal 23 (S301), the POS program 231 of the merchant terminal 23 transmits to the receipt printer 24 the receipt information required for printing the receipt among the received payment information (S302), The receipt printer 24 prints the receipt on the receipt paper based on the receipt information received from the POS program 231 in the merchant terminal 23 (S303).

At the same time, the agent program 232 in the merchant terminal 23 acquires the receipt information from the POS program 231 (S304). More specifically, the POS program 231 may transmit the receipt information to the agent program 232. Such transmission of the receipt information may be performed automatically whenever the POS program 231 receives the payment information from the user. Alternatively, the agent program 232 may be configured to continuously monitor the communication between the POS program 231 and the receipt printer 24. During the monitoring, when the agent program 232 recognizes that the receipt information is being transmitted to the receipt print 24 by the POS program 231, the agent program 232 may hook or capture the receipt information which is being transmitted to the receipt printer 24 from the POS program 231 so as to obtain the receipt information. That is, the agent program 232 may configured to intercept or clone any receipt information generated by the POS program 231 without the instruction from the POS program 231. Further, in the same manner, the agent program 232 may capture or hook the receipt information which is being transmitted to any external devices from the merchant terminal 23. For example, the agent program 232 may capture the receipt information from the data, i.e., the payment information which is being transmitted from the merchant terminal 23 to the credit card approval server. For the same reasons, the agent program 323 may capture the receipt information from the related data which the merchant terminal 23 is being received from any external devices (e.g., the credit card approval server).

The agent program 232 stores in its own storage device or buffer, the receipt information that has been received from the POS program 231 or has been hooked from the communication between the POS program 231 and the receipt printer 24 (S305). The agent program 232 then waits or stands by until the request for the receipt information is transmitted from the transmission server 25, while holding or maintaining the obtained receipt information therein. That is, the agent program 232 temporarily stores the obtained receipt information and is on the alert or standby, in preparation for the request from the user's smartphone 21 via the transmission server 25. Such a configuration of the agent program 232 allows a rapid and efficient response to the request for the receipt information while also allowing a sufficient time period for the user to make the request for the receipt information.

More specifically, the agent program 232 may store only one latest receipt information obtained from the POS program 231. When obtaining the next receipt information, the agent program 232 may update the receipt information stored therein by overwriting on the previous receipt information.

Alternatively, the software agent 232 may store the receipt information obtained from the POS program 231 in a stacking manner so as to transmit the receipt information in a First-In Last-Out (FILO) manner.

At any time during the transaction with the merchant, preferably after the payment is completed, the user may execute the application (i.e., the receipt storing application) installed on the smartphone 21 to receive the receipt information on the smartphone 21 (S306). Meanwhile, the user may execute the application before the payment is completed. Then, the user touches the smartphone 21 on the ID provider 22, i.e., the NFC tag, and the smartphone 21 acquires the merchant terminal ID from the NFC tag 22 (S307).

The smartphone 21, particularly the application in the smartphone 21 which has obtained the merchant terminal ID, requests the receipt information to the transmission server 25 along with the obtained merchant terminal ID (S308). More specifically, the smartphone 21 generates a first message for requesting the receipt information, which includes the obtained merchant terminal ID, and transmits the first message to the transmission server 25.

Upon receiving the first message from the smartphone 21, the transmission server 25 determines or identifies a merchant terminal to which the receipt information requested by the smartphone 21 should be requested from among a plurality of merchant terminals existing in the network, by using the merchant terminal ID received from the smartphone 21. Then, the transmission server 25 requests the receipt information to the merchant terminal 23 corresponding to the received merchant terminal ID (S309). More specifically, the transmission server 25 generates a second message for requesting the receipt information, and transmits the second message to the merchant terminal 23 identified or specified by the received merchant terminal ID.

Upon receiving the request for receipt information from the transmission server 25, the agent program 232 of the merchant terminal 23 transmits the most recent receipt information among the stored receipt information to the transmission server 25 (S310). Generally, except for the last receipt information, it is very likely that other receipt information previously obtained by the agent program 232 has been abandoned by the user or has been oriented from the transactions of other user. For these reasons, by transmitting the most recent receipt information, the agent program 232 can provide the correct receipt information that the user currently requesting via the transmission server 25 wishes to receive.

When the transmission server 25 receives the receipt information from the merchant terminal 23 (S310), the transmission server 25 transmits the received receipt information to the smartphone 21 (S311).

When the receipt information is received by the smartphone 21, the smartphone 21, i.e., the application stores the received receipt information (S312) for the various purposes and usages as shown in steps 1c and 1f of FIG. 1. Further, the smartphone 21 (i.e., the receipt storing application) displays a message asking whether to transmit the received receipt information to the provider server 26 of the online service provider, as shown in step 1d of FIG. 1. At the same time, the smartphone 21 may receive the promotion event or the reward information from the transmission server 25 and display such event and reward on the screen thereof along with the message so as to encourage or motivate the user to transmit the receipt information to the provider server 26. The transmission server 25 may receive the promotion event or the reward information in advance from the provider server 25 associated with the receipt storing service of the transmission server 25.

When the user selects or decides to transmit the receipt information to the provider server 26, the smartphone 21 (for example, the receipt storing application) transmits the receipt information to the provider server 26 (S313). The provider server 26 receives the receipt information from the smartphone 21 and stores the received receipt information (S314). The provider server 26, i.e., the online service provider can utilize the receipt information as the marketing or promoting information.

Figure 4:
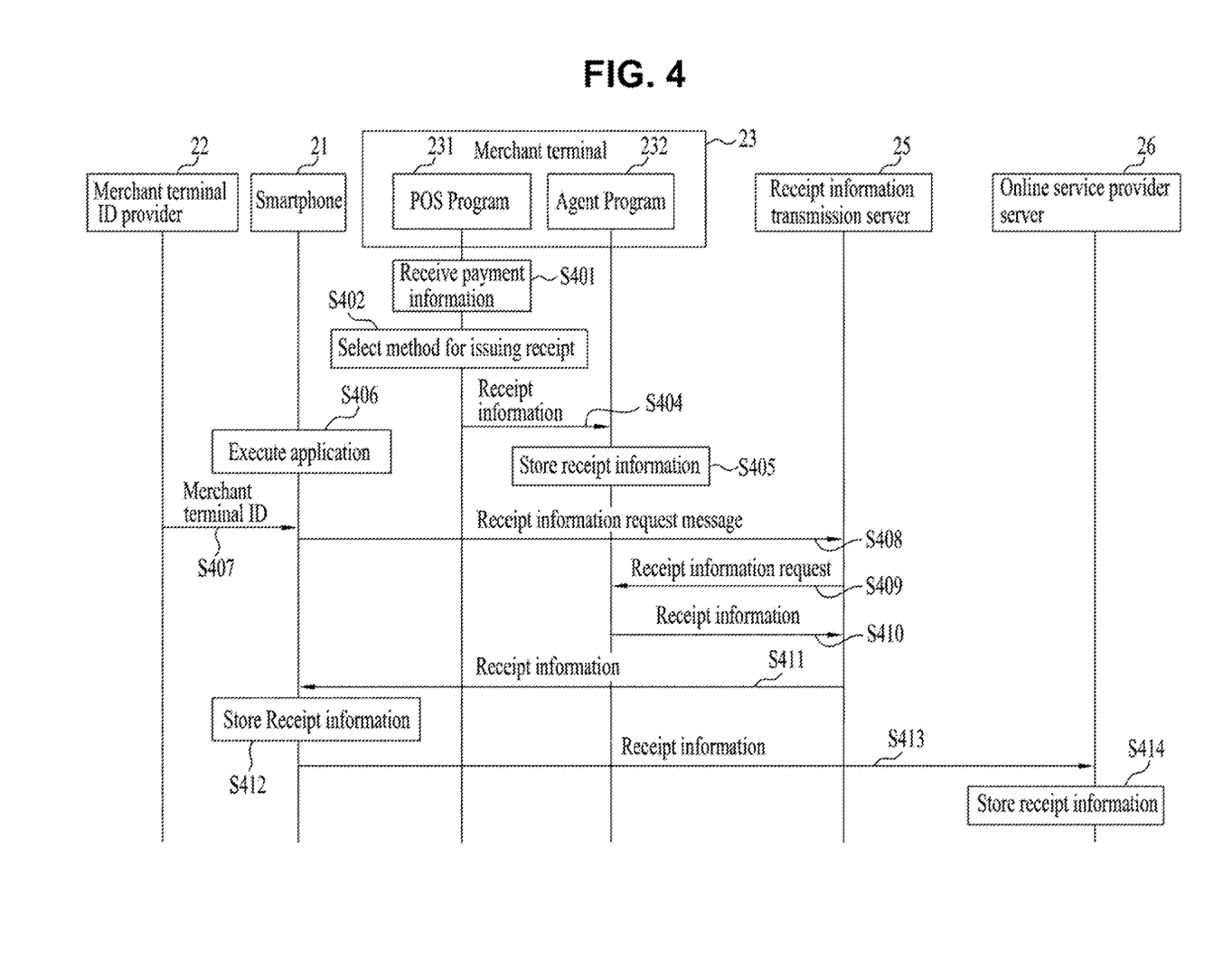
FIG. 4 is a signal processing chart showing a second embodiment of a method for transmitting receipt information according to the invention.

FIG. 4 is a signal processing chart showing a second embodiment of a method for transmitting receipt information according to the invention.

As shown in FIG. 4, when the user pays for the product or service using various methods such as the credit card, the cash, or the simple or mobile payment using the smartphone 21, the information related to the product or service transaction is transmitted and inputted to the merchant terminal 23 (S401).

The merchant terminal 23 may be various devices for inputting and/or managing transaction details, but in the embodiment as below, for example, the merchant terminal 23 comprising the POS system will be described.

When the merchant terminal 23 comprises the POS system, the POS program 231 which is software for operating the POS system or device is installed in the POS system. In addition, an agent program 232 for performing a predetermined function may be installed in the POS system. As these POS program 231 and the agent program 232 are the same as those described with regard to FIG. 3, further description will be not provided below.

When the payment information is received at the merchant terminal 23 (S401), the merchant terminal 23 displays on a screen thereof a message requesting the selection of the method for issuing the receipt (S402). That is, after the completion of the payment using the merchant terminal 23 in the offline store, the user is asked whether to issue the paper receipt or to issue the electronic receipt for the smartphone 21.

If the user wishes the electronic receipt, the issuing of the electronic receipt is selected at the merchant terminal 23 (S402), and the POS program 231 in the merchant terminal 23 transmits the receipt information to the agent program 232 which is also installed in the merchant terminal 23 (S404). Alternatively, if the user wishes the paper receipt instead, the POS program 231 transmits the receipt information to the receipt printer 24 such that the receipt printer 24 prints the receipt on the paper for the user as already described with reference to step S303 of FIG. 3. Further, if the user wishes both of the electronic and paper receipts, the POS program 231 may performs the processes or steps for both cases as described above at the same time.

The agent program 232 stores in its own storage device or buffer, the receipt information that has been received from the POS program 231 (S405). The agent program 232 then waits or stands by until a request for the receipt information request is transmitted from the transmission server 25, while holding or maintaining the obtained receipt information. That is, the agent program 232 temporarily stores the obtained receipt information and is on the alert or standby, in preparation for the request from the user's smartphone 21 via the transmission server 25. Such a configuration of the agent program 232 allows a rapid and efficient response to the request for the receipt information while also allowing a sufficient time period for the user to make the request for the receipt information.

More specifically, if new receipt information is transmitted from the POS program 231 before any request for receipt information arrives, the previously stored receipt information is deleted and the newly delivered receipt information is stored, and then the agent program 232 may wait for receiving the request for receipt information from the transmission server 25. Alternatively, the software agent 232 may store the receipt information obtained from the POS program 231 in a stacking manner so as to transmit the receipt information in a First-In Last-Out (FILO) method.

At any time during the transaction with the merchant, preferably after the payment is completed, the user may execute the application (i.e., the receipt storing application) installed on the smartphone 21 to receive the receipt information on the smartphone 21 (S406). Meanwhile, the user may execute the application before the payment is completed, instead. Then, the user touches the smartphone 21 on the ID provider 22, i.e., the NFC tag, and the smartphone 21 acquires the merchant terminal ID from the NFC tag 22 (S407).

The smartphone 21, particularly the application in the smartphone 21 which has obtained the merchant terminal ID, requests the receipt information to the transmission server 25 along with the obtained merchant terminal ID (S408). More specifically, the smartphone 21 generates a first message for requesting the receipt information, which includes the obtained merchant terminal ID, and transmits the first message to the transmission server 25.

Upon receiving the first message from the smartphone 21, the transmission server 25 determines or identifies a merchant terminal to which the receipt information requested by the smartphone 21 should be requested from among a plurality of merchant terminals existing in the network, by using the merchant terminal ID received from the smartphone 21. Then, the transmission server 25 requests the receipt information to the merchant terminal 23 corresponding to the received merchant terminal ID (S409). More specifically, the transmission server 25 generates a second message for requesting the receipt information, and transmits the second message to the merchant terminal 23 identified or specified by the received merchant terminal ID.

Upon receiving the request for receipt information from the transmission server 25, the agent program 232 of the merchant terminal 23 transmits the most recent receipt information among the stored receipt information to the transmission server 25 (S410). Generally, except for the last receipt information, it is very likely that other receipt information previously obtained by the agent program 232 has been abandoned by the user or has been oriented from the transactions of other user. For these reasons, by transmitting the most recent receipt information, the agent program 232 can provide the correct receipt information that the user currently requesting via the transmission server 25 wishes to receive.

When the transmission server 25 receives the receipt information from the merchant terminal 23 (S410), the transmission server 25 transmits the received receipt information to the smartphone 21 (S411).

When the receipt information is received by the smartphone 21, the smartphone 21, i.e., the application stores the received receipt information (S412) for the various purposes and usages as shown in steps 1c and 1f of FIG. 1. Further, the smartphone 21 (i.e., that application) displays a message asking whether to transmit the received receipt information to the provider server 26 of the online service provider, as shown in step 1d of FIG. 1. At the same time, the smartphone 21 may receive the promotion event or the reward information from the transmission server 25 and display such event and reward on the screen thereof along with the message so as to encourage or motivate the user to transmit the receipt information to the provider server 26. The transmission server 25 may receive the promotion event or the reward information in advance from the provider server 25 associated with the receipt storing service of the transmission server 25.

When the user selects or decides to transmit the receipt information to the provider server 26, the smartphone 21 transmits the receipt information to the provider server 26 (S413). The provider server 26 receives the receipt information from the smartphone 21 and stores the received receipt information (S414). The provider server 26, i.e., the online service provider can utilize the receipt information as the marketing or promoting information.

The method according to the present invention has the technical advantages as follows.

According to the present invention, as an electronic receipt is received through the user's mobile terminal, unnecessary printing of a paper receipt is prevented.

In addition, since the user's mobile terminal receives or keeps the receipt, the receipt can be stored and checked conveniently. Further, since the receipt information can be easily transmitted to a third party, such a third party such as any online service provider can use the received receipt information as marketing or promoting information for business.

Although a number of examples have been described, it should be understood that other modifications and implementations can be devised by those skilled in the art that will fall within the spirit and scope of the principles of the present invention. More particularly, various variations and modifications in the structure or the configuration are possible within the scope of the disclosure, the drawings and the appended claims. In addition to variations and modifications in the configuration, alternative uses will also be apparent to those skilled in the art.

What is claimed is:

1. A system for transmitting receipt information, the system comprising:
   a merchant terminal ID provider configured to store a merchant terminal ID;
   a mobile terminal of a user configured to acquire the merchant terminal ID from the merchant terminal ID provider and to generate a first request message for requesting receipt information including the acquired merchant terminal ID after a payment for an item;
   a receipt information transmission server configured to receive the first request message from the mobile terminal and to generate a second request message for requesting the receipt information after receiving the first request message; and a merchant terminal configured to receive the second request message from the receipt information transmission server and to transmit the receipt information to the receipt information transmission server after receiving the second request message, wherein the receipt information transmission server transmits the receipt information received from the merchant terminal to the mobile terminal, wherein the merchant terminal includes a Point-Of-Sale (POS) program which is a software for operating the merchant terminal and an agent program which is a software interface between the merchant terminal and the receipt information transmission server, wherein the agent program is configured to acquire the receipt information from the POS program after the payment at the merchant terminal, wherein, in order to acquire the receipt information, the agent program is configured to:
 continuously monitor a communication between the POS program and an external device; and
 after the agent program recognizes that the receipt information is being transmitted to the external device by the POS program during a monitoring of the communication, capture the receipt information which is being transmitted to the external device from the POS program, wherein the agent program is further configured to transmit the acquired receipt information to the receipt information transmission server only after the agent program receives the second request message from the receipt information transmission server.

2. The system of claim 1, wherein the merchant terminal ID is assigned to the merchant terminal to be unique within a network.

3. The system of claim 1, wherein the merchant terminal ID provider is configured to transmit the merchant terminal ID, in response to a predetermined manipulation of the mobile terminal.

4. The system of claim 3, wherein the merchant terminal ID provider comprises a NFC tag configured to transmit the merchant terminal ID to the mobile terminal when the mobile terminal contacts the NFC tag.

5. The system of claim 1, wherein the receipt information transmission server is configured to identify the merchant terminal using the merchant terminal ID included in the first request message.

6. The system of claim 1, wherein the receipt information transmission server is configured to transmit the second request message to the agent program and to receive the receipt information from the agent program in the merchant terminal.

7. The system of claim 1, wherein the agent program is configured to enable data exchange between the receipt information transmission server and the merchant terminal.

8. The system of claim 1, wherein after acquiring the receipt information, the agent program is configured to:
 stand by for a predetermined time period while holding the acquired receipt information; and
 transmit the acquired receipt information to the receipt information transmission server after receiving the second request message from the receipt information transmission server.

9. The system of claim 1, wherein in order for the agent program to acquire the receipt information, the POS program is configured to directly transmit the receipt information to the agent program.

10. The system of claim 1, wherein the mobile terminal is configured to transmit the receipt information received from the receipt information transmission server to an online server provider server, which operates Internet-based services for the user.

11. The system of claim 1, wherein the external device is a printer connected to the merchant terminal to print a paper receipt including the receipt information.

12. A method for transmitting receipt information, the method comprising:
 storing, by a merchant terminal ID provider, a merchant terminal ID;
 acquiring, by a mobile terminal of a user, the merchant terminal ID from the merchant terminal ID provider and generating, by the mobile terminal, a first request message for requesting receipt information after a user payment, the first request message including the acquired merchant terminal ID;
 receiving, by a receipt information transmission server, the first request message from the mobile terminal and generating, by the receipt information transmission server, a second request message for requesting the receipt information after receiving the first request message;
 acquiring, by an agent program of a merchant terminal, the receipt information from a Point-Of-Sale (POS) program of the merchant terminal after the user payment, receiving, by the agent program, the second request message from the receipt information transmission server, and transmitting, by the agent program, the acquired receipt information to the receipt information transmission server only after the agent program receives the second request message from the receipt transmission information server; and
 transmitting, by the receipt information transmission server, the receipt information received from the agent program to the mobile terminal, wherein the POS program is a software for operating the merchant terminal and the agent program is a software interface between the merchant terminal and the receipt information transmission server, wherein the acquiring, by the agent program, the receipt information from the POS program comprises:
 continuously monitoring, by the agent program, a communication between the POS program and an external device; and
 capturing, by the agent program, the receipt information after the agent program recognizes that the receipt information is being transmitted to the external device by the POS program during monitoring of the communication.

13. The method of claim 12, wherein the external device is a printer connected to the merchant terminal to print a paper receipt including the receipt information.

* * * * *